June 24, 1941.   R. S. FRANCIS   2,246,917
METHOD OF AND APPARATUS FOR SEPARATING A RUBBER RIBBON
INTO ITS INDIVIDUAL THREADS
Filed Dec. 27, 1939   2 Sheets-Sheet 2

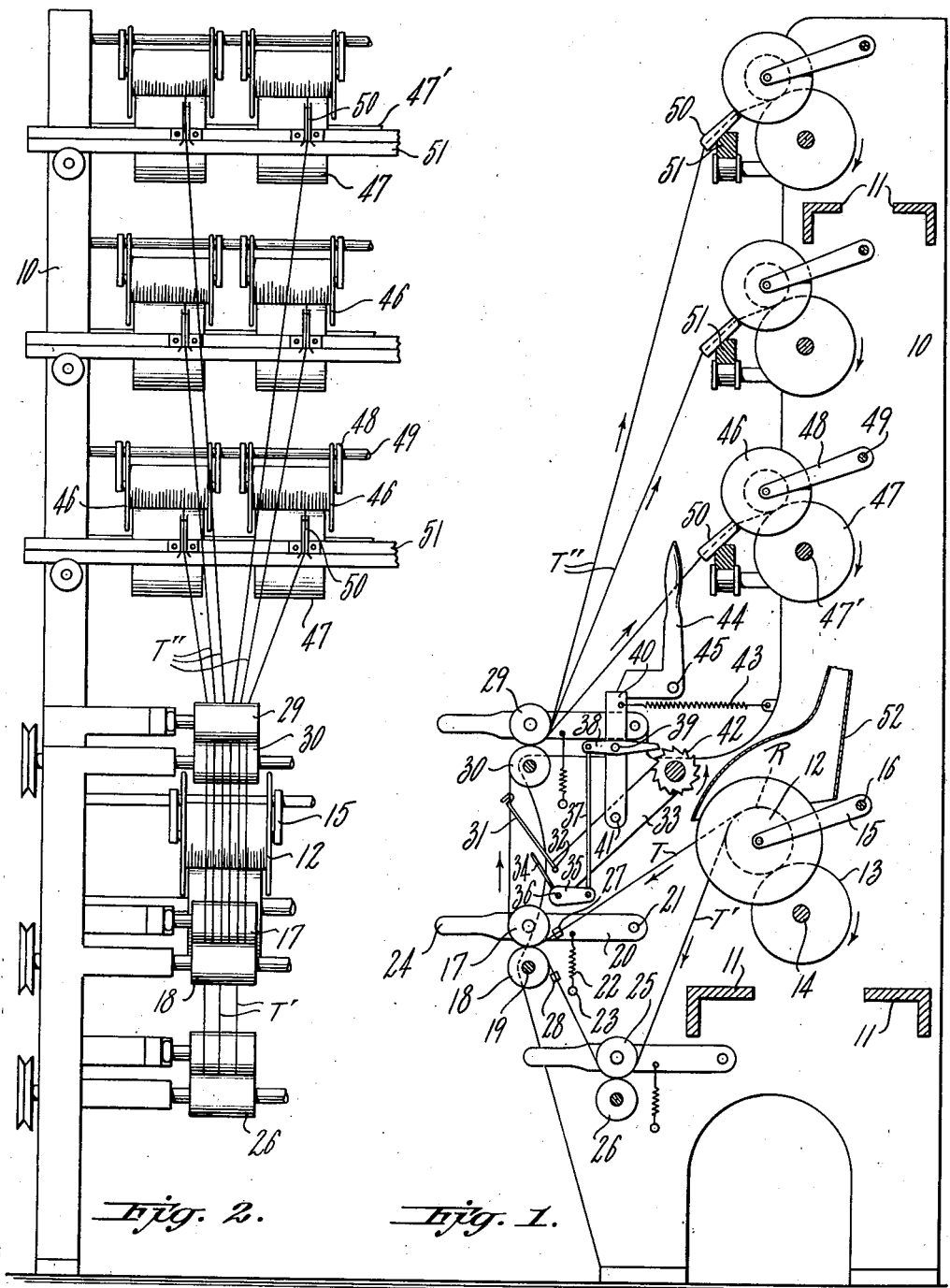

INVENTOR.
RAYMOND S. FRANCIS
BY Gourley & Budlong
ATTORNEYS

Patented June 24, 1941

2,246,917

UNITED STATES PATENT OFFICE 2,246,917

METHOD OF AND APPARATUS FOR SEPARATING A RUBBER RIBBON INTO ITS INDIVIDUAL THREADS

Raymond S. Francis, Rumford, R. I., assignor to United States Rubber Company, New York, N. Y., a corporation of New Jersey Application December 27, 1939, Serial No. 311,221

7 Claims. (Cl. 242—45)

This invention relates to a rubber ribbon ormed of a number of individual bare rubber threads adhesively connected side by side to form the ribbon, and more particularly to the method of and apparatus for separating the ribbon into its individual threads.

It has been proposed heretofore to form a ribbon of a number of rubber threads adhesively secured together so that the ribbon may be subsequently separated into the individual threads. Difficulty has been experienced heretofore, however, in providing mechanism for effecting the separation of these threads from each other without subjecting them to an objectionably high tension or pull which causes excessive breakage of the rubber threads.

The present invention contemplates a novel method of and apparatus for separating the rubber ribbon into its individual threads without subjecting such threads to an objectionably high tension or strain.

More particularly the present invention relates to the method of and apparatus for separating the ribbon into its individual threads by subjecting some of the threads of the ribbon to a substantial tension and other adjacent threads to much less tension, so that the tension differential thus produced in the ribbon between adjacent threads will serve to break the bond therebetween.

By employing the present invention a separation of the threads forming the ribbon is secured by the contractive action of some threads relative to the others, and this contractive force will necessarily be below the breaking tension of the threads. In this manner the threads are separated with a minimum amount of thread breakage.

The above and other features of the invention and novel combination of parts will be hereinafter described in connection with the accompanying drawings which illustrate good practical forms of mechanism for carrying out the invention.

In the drawings:

Fig. 1 is a side elevation of a machine constructed in accordance with the present invention for separating a ribbon of rubber into its individual threads;

Fig. 2 is a front elevation of a portion of the machine of Fig. 1;

Figure 3:
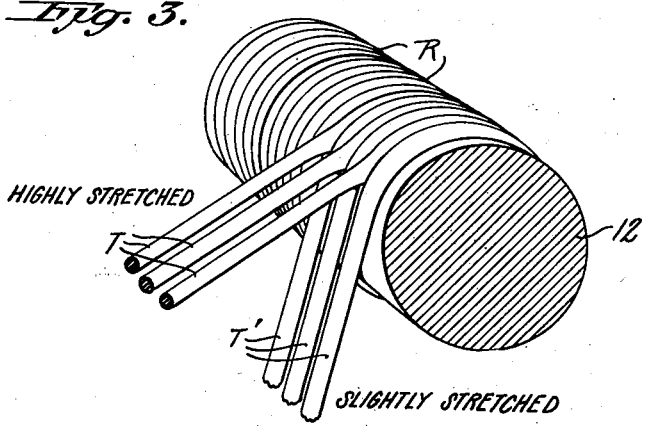
Fig. 3 is a perspective view on an enlarged scale of parts shown in Fig. 1.

The method and apparatus of the present invention may be employed to separate a ribbon formed of various types of rubber threads which are adhesively but non-integrally connected side by side. Such rubber threads may constitute cut rubber threads adhesively secured together to form a ribbon as proposed heretofore, or the ribbon to be separated into the individual threads may be formed of extruded rubber threads adhesively but non-integrally secured together side by side.

It has been proposed heretofore as disclosed in the Hopkinson et al. Patent No. 1,545,257 to produce extruded latex threads by extruding latex into a coagulant to form the individual threads having a more or less tacky outer surface and then deliver these freshly formed threads to a conveyor belt in spaced relation to each other so that they do not contact until they have been dried and vulcanized.

More recently it has been proposed to bring these freshly formed extruded latex threads into contact with each other side by side to form them into a ribbon before they are dried or vulcanized, so that the ribbon thus formed may be passed through the drying and vulcanizing chamber, after which the ribbon may be separated into its individual threads. In order that the threads may be separated again after having been formed into a ribbon, it is important that when these freshly formed and tacky threads are brought into contact with each other they be prevented from becoming integrally bonded one to the other to such an extent that they cannot be later separated.

It has been found that a desired slight bond between these tacky threads may be secured by the use of talc upon the threads before they are brought into contact with each other. It has also been found that a simple and practical way to control the strength of this bond is to place talc or the like in the coagulant bath. The strength of this bond may be accurately controlled by varying the amount of talc in the coagulant to thereby secure a sufficiently strong bond to hold the ribbon intact during the drying and vulcanizing operation but permit a ready separation of the ribbon into its individual threads after the threads have been vulcanized.

The present invention is well adapted for use in connection with various size rubber threads but its advantages are particularly important in connection with the smaller size rubber threads such as 100's or finer where the thread will break if subjected to a pull of more than several ounces.

The embodiment of the invention disclosed in Figs. 1, 2 and 3 will now be described, wherein there is shown in Figs. 1 and 2 a machine of any suitable length to support the desired number of independent units for separating ribbons into the individual rubber threads.

This machine is shown as provided with an upstanding end frame 10 which may be connected by the horizontally extending rails 11 to a similar end member, not shown. It will be apparent from Fig. 2 that only a single operating unit lying near the end member 10 is illustrated in this view.

As above pointed out the present invention contemplates a method of and apparatus for separating a ribbon formed of a number of rubber threads into the individual threads. This ribbon which is indicated by R may be wound upon a supply spool 12 from which it may be unwound at a controlled speed by the driving roll 13 mounted upon its driving shaft 14. The arrangement is such that the supply spool 12 rests by gravity upon the roll 13 to be driven thereby at a constant speed irrespective of the amount of rubber ribbon wound thereupon. The spool 12 may be supported for swinging movement towards and from the roll 13 by the supporting arms 15 which are mounted to swing about the pivotal support 16. Rotation of the driving roll 13 in the direction indicated by the arrow will serve to rotate the supply spool 12 to unwind the ribbon therefrom at a constant speed so that the ribbon may be tensioned the desired amount.

As above stated the separation of the bond between the individual threads forming the ribbon R is secured by tensioning some threads relative to the others to thereby produce a tension differential in the ribbon sufficient to break the bond between the adjacent threads. This is accomplished in the embodiment of the invention shown in Figs. 1, 2 and 3 by leading some of the threads T, such for example, as the even numbered threads counting from one edge of the ribbon along one path and the odd numbered threads T' counting from the same edge of the ribbon along a different path so that the threads passing along one path may be placed under a relatively high tension while those travelling along the other path are subjected to a much lower tension. The ribbon R may be formed of any desired number of threads but is formed of six threads as shown.

In the construction shown, the threads T are led to the pinch feed rolls 17 and 18, the lower roll being positively driven and the upper roll being rotated by its engagement with the positively driven roll or the rubber threads passing between the two rolls. In the construction shown the lower roll 18 is driven at a predetermined speed by its shaft 19, and the upper roll 17 is rotatably supported by the yoke or the like 20 which is pivotally mounted at 21 for swinging movement to support the roll 17 for movement towards and from the driven roll 18. A spring 22 having one end secured to the yoke 20 and the other end secured to a fixed point such as the pin 23 serves to urge the roll 17 downwardly to thereby exert the desired pinching pressure upon the threads passing between the rolls. In order to facilitate the threading of the threads T between these rolls a handle 24 is provided so that the roll 17 may be swung upwardly away from the roll 18 during the threading operation.

The group of threads T' are shown as passing between a different set of pinch feed rolls 25 and 26 which may be similar in construction and operation to the pinch rolls 17 and 18, except that the roll 26 is driven at a peripheral speed only slightly in excess of the peripheral speed of the driving roll 13 whereas the roll 18 is driven at a much higher peripheral speed. The arrangement is such that the threads T are subjected to approximately a 400% stretch as they extend from the let-off spool 12 to the pinch feed rolls 17 and 18 whereas the threads T' are subjected to only about a 15% stretch as they extend from the let-off spool 12 to the pinch feed rolls 25, 26.

The effect of this, as above stated, is to produce a substantial tension differential in the ribbon R at the point at which it is unwinding from the spool 12. This tension differential serves to break the bond between the adjacent threads as the ribbon leaves the let-off spool 12, and the only purpose in placing any tension upon the threads T' is to keep them sufficiently taut to prevent them from becoming tangled. The threads T' are shown as passing upwardly from the pinch feed rolls 25 and 26 to the rolls 17 and 18, and since the roll 18 is driven at a much higher speed than the roll 26 these threads T' will be placed under a tension equal to that of the threads T by the time they reach the rolls 17, 18. It is desirable to spread the threads T, T' out somewhat out of contact with each other as they pass through the feed rolls 17, 18 and this may be done by providing the spreader 27 for the threads T and the spreader 28 for the threads T'.

In the construction shown, the threads T, T' are led upwardly in a relatively high tensioned condition from the pinch rolls 17, 18 to the pinch rolls 29, 30 which may be similar in construction and operation as the pinch rolls 17, 18, but are preferably operated at approximately the same peripheral speed as the rolls 17, 18. This is for the purpose of maintaining the threads under considerable tension between the sets of feed rolls just mentioned so that drop wires 31 may operate upon the tensioned threads along this stretch. To this end one drop wire 31 is provided for each rubber thread. These drop wires may be of any usual or well known construction and as shown are pivotally mounted at 32 upon a supporting bracket 33 so that the wires rest by gravity upon the rubber threads. If a thread breaks or becomes unduly slack the drop wire 31 resting thereupon will swing downwardly against the trip member 34 to thereby actuate the bell crank lever 35 which is pivoted upon the support 33 at 36. The rocking of the bell crank lever 35 raises the connecting rod 37, one end of which is connected to an arm of the bell crank lever and the other end is connected to a dog 38 pivoted at 39 upon a trip lever 40. The lower end of this lever 40 is pivoted at 41 upon the support 33. The arrangement is such that when a drop wire 31 drops it will tilt the dog 38 so as to move the right hand end of this dog as shown in Fig. 1 into the path of the power operated rotating ratchet wheel 42 to thereby cause the rotation of this ratchet wheel to push the trip lever 40 in a left hand direction, viewing Fig. 1, against the tension of its spring 43. This will serve to release the power control lever 44 which is pivotally mounted at 45 to thereby stop the winding operation of the threads and ribbon of the unit shown in Fig. 2, including the thread take-up means to be described.

The threads T and T' upon leaving the pinch rolls 29 and 30 and which threads are now designated for convenience as T'' are ready to be wound upon the individual spools 46 in condition to be supplied to the trade, or delivered to the covering machine where a textile cover may be wound about each rubber thread.

As will be apparent from Figs. 1 and 2 each of the rubber threads T'' is led upwardly to a different take-up spool 46. Each of these spools is preferably driven at a uniform peripheral speed irrespective of its size by mounting the same so that it will rest by gravity upon a power driven roll 47 which is supported and driven by an operating shaft 47'. Each spool 46 is shown as supported for swinging movement towards and from its driving roll 47 by the yoke 48 pivotally mounted at 49. The driving roll 47 is preferably operated at a much slower peripheral speed than the feed rolls 29, 30 so that the threads T'' will be delivered to their respective take-up spools under only a slight tension such for example as 15% elongation. There is preferably associated with each take-up spool 46 a traverse guide 50 and operating bar 51 of any usual or well-known construction adapted to wind a thread evenly upon the take-up spool.

Since it is contemplated that a substantial amount of talc will be used on the freshly formed rubber threads to prevent them from sticking too firmly to each other in the ribbon R there will probably be considerable talc on this ribbon. The separation of the threads of the ribbon as the latter is unwound from the spool 12 will release some of this talc, which is more or less objectionable as it will settle on the operating parts of the machine and will be injurious to the operator. To overcome this difficulty the hood 52 may be provided over the let-off spool 12 and is connected with suction means, not shown, to thereby carry off the free talc.

It will be seen from the foregoing that as a result of the present invention the operation of separating the ribbon R into its individual threads is effected very largely by the tension differential set up in the ribbon, and since this tension differential will never exceed the strength of the threads, the danger of breaking the threads is greatly reduced.

Figure 5:
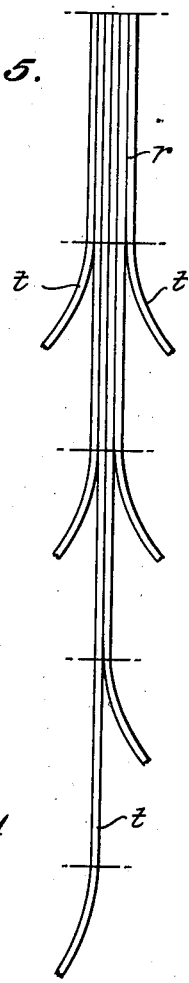
Fig. 5 on an enlarged scale is a plan view illustrating how the individual threads are separated from the ribbon by the mechanism of Fig. 4.
Figure 4:
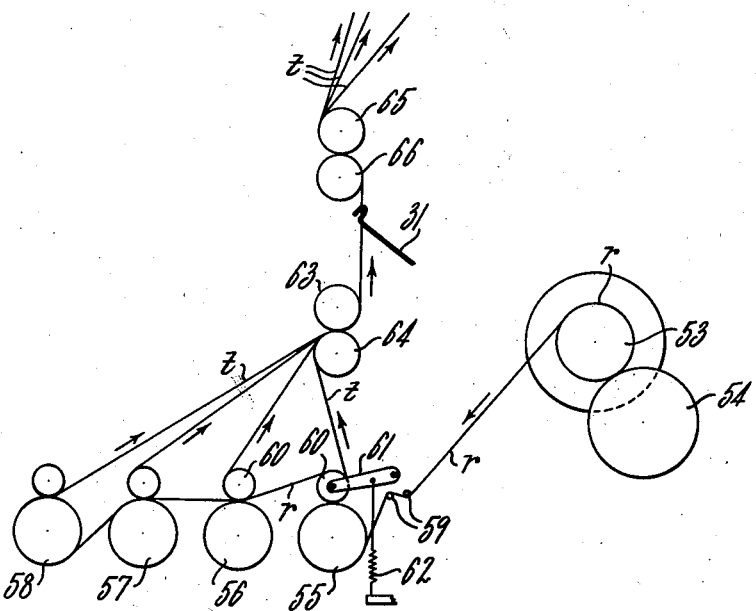
Fig. 4 is a diagrammatic side elevation of a modified construction for separating a ribbon of rubber into individual threads.

Having described the form of invention embodied in the construction shown in Figs. 1, 2 and 3, I will now take up the modified form of Figs. 4 and 5. In Fig. 5 is shown a ribbon $r$ formed in this particular case of six threads $t$ stuck together, and it is contemplated that the ribbon will be separated into its individual threads by stripping from the two edges of the ribbon at successive points along the ribbon only those threads that lie at each edge of the ribbon. By thus removing from the ribbon at any one point only those threads lying at its two edges, each thread at the instant it is being separated from the ribbon need be subjected to a force which is only sufficient to break the bond at one edge of the thread instead of at both sides of the thread at the same time. This obviously subjects the thread to much less tension than would be the case if it were pulled from a central portion of the ribbon where the bond at both edges of the threads has to be broken simultaneously.

In the modification of Figs. 4 and 5, it is contemplated as in the construction of Figs. 1, 2 and 3, that the tension differential set up in the ribbon will be utilized to break the bond between the threads.

To this end in the construction shown in Fig. 4, a ribbon $r$ is supplied by a let-off spool 53 which may be rotated at a predetermined speed in the ribbon unwinding direction by a driving roll 54, which may be similar in construction and operation to the driving roll 13 above described. The ribbon $r$ as will be apparent in Fig. 4 is led from the let-off spool 53 to the first of a series of power driven rolls 55, 56, 57 and 58 all rotated at approximately the same speed. The ribbon $r$ as it approaches the roll 55 may pass between the guide wires 59 which serve to keep the ribbon flat. It then passes around the greater portion of the roll 55 to produce a substantial amount of friction between the ribbon and this roll to prevent slippage and each of the rolls 55 to 58 inclusive is preferably provided with a rubber face to thereby lessen the danger of slippage occurring between the ribbon and these rolls.

The supply spool 53 is preferably rotated at such a speed that the ribbon $r$ will be highly tensioned as it travels from the spool 53 to the roll 55. As this ribbon $r$ passes upwardly around the power operated roll 55 it engages the idler roll 60 which is supported for swinging movement towards and from the roll 55 by the yoke 61 that is urged downwardly by a spring 62. As the ribbon $r$ passes upwardly about the idler roll 60 the main portion of the ribbon is led laterally under its high tension between the next power driven roll 56 and its cooperating idler roll 60, while the threads $t$ which are removed from each edge of the ribbon at 55 are led upwardly under slight tension to the pinch feed rolls 63 and 64 which rolls may be similar in construction and operation to the pinch feed rolls 17 and 18, above described.

These rolls 63 and 64 are rotated at a peripheral speed very much lower than the speed of the roll 55 so that the threads $t$ extending upwardly from the roll 55 to the rolls 63 and 64 will be placed under only a slight tension sufficient to keep them from becoming entangled. The main portion of the ribbon $r$, however, as it passes from the first idler roll 60 to the driven roll 56 is maintained under high tension so that the tension differential produced between the main portion of the ribbon $r$ and the threads $t$ at each edge thereof is utilized to separate these threads from the main portion of the ribbon.

A similar effect is secured at the nip between the roll 56 and its idler roll so that two more threads $t$ are removed from the main portion of the ribbon at 56. This removes four of the threads from the ribbon which it is assumed consists of six threads at the start and leaves two remaining threads. One of these remaining threads is separated from the other at the nip of the roll 57 and its idler, whereas the remaining thread passes around the roll 58 and its idler and then to the pinch feed rolls 63 and 64. The six separate threads which are preferably spaced sufficiently from each other to keep them from contacting, pass upwardly from the feed rolls 63, 64 to a similar pair of feed rolls 65 and 66 and preferably are maintained under high tension as they pass from one of the pairs of rolls to the other so that they may be acted upon by drop wires 31 such as above described. The threads $t$ upon leaving the pinch feed rolls 65 and 66 may be wound upon individual take-up spools, not shown, but which may be similar to the spool 46 above described.

It will be seen from the foregoing that in the construction shown in Figs. 1, 2 and 3 and also in the modified construction of Figs. 4 and 5 the tension differential set up in adjacent threads is utilized to break the bond between such threads.

Having thus described my invention, what I claim and desire to protect by Letters Patent is:

1. The method of separating a ribbon formed of rubber threads non-integrally connected side by side into its individual threads, which consists in first separating these threads adjacent one end of the ribbon so that the alternate threads may be led along one path and the remaining threads along a different path, and advancing said threads along one of said paths under high tension and along the other path under slight tension so that the tension differential thus produced longitudinally in the ribbon between the slightly tensioned threads and highly tensioned threads will serve to break the bond between said threads.

2. The method of separating a ribbon formed of rubber threads non-integrally connected side by side into its individual threads, which consists in first separating these threads adjacent one end of the ribbon so that some of said threads may be led along one path and others along a different path, and advancing the threads along one of said paths under high tension and along the other path under slight tension so that the tension differential thus produced longitudinally in the ribbon between the slightly tensioned threads and adjacent highly tensioned threads will serve to break the bond between these threads.

3. The method of separating a ribbon formed of rubber threads non-integrally connected side by side into its individual threads, which consists in first separating these threads adjacent one end of the ribbon so that some of said threads may be led along one path and others along a second path and advancing the threads along one path under high tension and along the other path under slight tension to thereby produce a sufficient tension differential longitudinally in the ribbon between the high tension and low tension threads to cause this differential alone to break the bond between such threads.

4. The method of separating a ribbon formed of rubber threads adhesively connected side by side into its individual threads, which consists in first separating the alternate threads adjacent one end of the ribbon into one group and the even threads into another group, then advancing the threads of one group along a path under high tension and those of the other group along a second path under slight tension to thereby produce a sufficient tension differential longitudinally in the ribbon between the high tension threads and low tension threads to cause this differential to break the adhesive bond between the threads.

5. In an apparatus of the class described, in combination, means for delivering at a controlled rate of speed from a source of supply a ribbon formed of rubber threads adhesively connected one to the other, feed means for advancing some of the threads of said ribbon along one path under high tension and other threads of said ribbon along a second path under slight tension so that the tension differential thus produced in the ribbon between said threads serves to break the adhesive bond therebetween, means for winding the individual threads into packages, and stop mechanism for stopping the operation of all of said means when a thread breaks.

6. In an apparatus of the class described, in combination, a supply spool having a ribbon formed of rubber threads adhesively connected one to the other, means for driving said spool to unwind the ribbon therefrom at a controlled predetermined speed; means for advancing some of the threads along one path under high tension and along another path under slight tension so that the tension differential thus produced in the ribbon between said threads serves to break the adhesive bond therebetween, means for winding the individual threads into packages, and stop mechanism for stopping the operation of all of said means when a thread breaks.

7. In an apparatus of the class described, in combination, mechanism for advancing a ribbon formed of adhesively connected rubber threads, including a series of feed rolls, means for operating some of said feed rolls at a relatively high surface speed to feed said ribbon at successive points and maintain it highly stretched at these points, means for operating other of said feed rolls at a lower surface speed to thereby produce a tension differential between the ribbon and the successive outer threads at said points to break the bond therebetween and separate the ribbon into its individual threads, take-up mechanism for said threads, and stop mechanism for stopping the ribbon and thread feed when a thread breaks.

RAYMOND S. FRANCIS.